United States Patent [19]

Tanaka et al.

[11] 4,302,493
[45] Nov. 24, 1981

[54] DENSE, ELEGANT AND PLIABLE SHEET MATERIAL COMPRISING FIBROUS BASE IMPREGNATED WITH A DIOL-HINDERED AMINE POLYURETHANE SYSTEM

[75] Inventors: Minoru Tanaka, Gifu; Kenkichi Yagi, Kyoto, both of Japan

[73] Assignee: Toray Industries, Incorporated, Tokyo, Japan

[21] Appl. No.: 122,845

[22] Filed: Feb. 20, 1980

[30] Foreign Application Priority Data

Aug. 14, 1979 [JP] Japan ................................. 54-103424

[51] Int. Cl.³ ........................ B32B 3/00; B32B 27/12; B32B 27/40; B32B 33/00
[52] U.S. Cl. ..................................... 428/91; 428/95; 428/96; 428/253; 428/260; 428/262; 428/265; 428/267; 428/272; 428/288; 428/290; 428/423.5; 428/423.7; 428/903; 428/904
[58] Field of Search ..................... 428/91, 95, 96, 253, 428/260, 262, 265, 267, 272, 288, 290, 903, 904, 423.7

[56] References Cited

U.S. PATENT DOCUMENTS 3,899,292  8/1975  Okazaki et al. ........................ 8/495
4,102,870  7/1978  Hofmann ................................ 528/73

Primary Examiner—James C. Cannon
Attorney, Agent, or Firm—Miller & Prestia

[57] ABSTRACT

A composite sheet material comprising a fibrous sheet which is impregnated and/or coated with a polyurethane elastomer, wherein said polyurethane elastomer comprises the reaction product of
(A) a polymeric diol having a molecular weight of about 800–5000,
(B) an organic polyisocyanate, and
(C) a chain extender comprising a low molecular weight organic diol, and if desired,
(D) a chain terminator; wherein more than 2 mol % of (C) and/or (D) comprise a hindered amine compound having the formula I

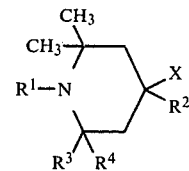

wherein
$R^1$ is a substituent selected from the group consisting of hydrogen, oxygen, an alkyl group containing 1–12 carbon atoms, an aralkyl group containing 7–18 carbon atoms, an acyl group containing 1–12 carbon atoms, $-(R^5O)_nH$ and $-(COR^6CO_2R^7O)_m-H$, wherein $R^5$ is an alkylene group containing 1–12 carbon atoms, $R^6$ is a residue of an alkenyl group containing 2–12 carbon atoms, an organic dicarboxylic acid containing 2–12 carbon atoms, $R^7$ is a residue of an organic diol containing 2–12 carbon atoms, n is an integer from 1 to 50 and m is an integer from 1 to 15;
$R^2$ is a substituent selected from the group consisting of hydrogen, an alkyl group containing 1–12 carbon atoms, an aryl group containing 6–18 carbon atoms and a cyano group;
X is a substituent selected from the group consisting of a hydroxyl group, an amino group and a monoalkylamino group containing 1–12 carbon atoms, and said substituents whose part or all of are hydrogen atoms bonded to oxygen and/or nitrogen may be substituted by $-(R^5O)_n-H$ and/or $-(COR^6CO_2R^7O)_m-H$, and
wherein $R^3$ and $R^4$ are the same or different alkyl groups containing 1–12 carbon atoms, $R^3$ and $R^4$ being independent or bonded to form a 5–12-membered alicyclic ring. Said composite sheet material is useful as a synthetic leather, especially as a suede-like leather. It has a dense and elaborate structure, as well as a good flexibility and pliability. Furthermore, it has superior initial properties and superior abrasion resistance after being worn for a long time.

26 Claims, No Drawings

DENSE, ELEGANT AND PLIABLE SHEET MATERIAL COMPRISING FIBROUS BASE IMPREGNATED WITH A DIOL-HINDERED AMINE POLYURETHANE SYSTEM

DETAILED DESCRIPTION OF THE INVENTION

This invention relates to a novel composite sheet material comprising a fibrous sheet and a polyurethane elastomer.

In U.S. Pat. No. 3,899,292, we have heretofore disclosed synthetic leathers comprising superfine filaments or fibers obtained from so-called islands-in-a-sea type multicomponent filaments or fibers together with a specific polyurethane elastomer. It is well known that the synthetic suede obtained by the methods described above has earned an excellent reputation in the textile art, and has become a well-known apparel material under the trademark "ULTRASUEDE". It has excellent qualities such as fine naps which give a graceful appearance, a supple touch, ease of handling, adaptability to a wide color variety, good color fastness, lightness and a high manufacturing yield. In addition to the excellent qualities as described above, it is still further desired to obtain a composite sheet material having a dense and elaborate structure as well as suppleness of hand, and pliability like some of the highest qualities of natural suede leather, such as calf suede.

We have investigated extensively the interaction of the fibers and the porous structure of the polyurethane elastomer and have found that an elaborate and dense structure gives a synthetic leather which is less flexible, less supple and presents more difficulty in raising naps. On the other hand, a soft hand is obtained by making the density low, but at the same time, this unfavorably affects surface smoothness.

The unfavorable qualities described above make the sheet undesirable and cause it to lose its good appearance and its good wear characteristics. In addition, after wearing for a long time as an apparel material, the synthetic leather not only discolors as well as loses its strength, but also loses its initial excellent hand characteristics, after repeated laundering and dry cleaning, ironing, or exposure to ultraviolet rays or nitrogen oxide gas, for example. Especially in the case of synthetic suede, the excellence of the napped surface appearance and the so-called "writing effect" of fingers marks is much influenced by deterioration of the polyurethane elastomer binding the filaments or fibers.

We have extensively investigated the problems described above, considering the interaction of the fibers and the porous structure of the polyurethane elastomer, the composition, properties, structure and the method of the application of the polyurethane elastomer.

It has already been proposed to incorporate a specific hindered amine within a polyurethane molecular chain to obtain a stabilized polyurethane elastomer. This is disclosed in U.S. Pat. No. 4,102,870 which, however, does not describe or indicate how to obtain a composite sheet material having the striking advantages of this invention. We have previously proposed a composite sheet material comprising a fibrous sheet material which is impregnated and/or coated with a polyurethane elastomer; wherein said polyurethane elastomer comprises the reaction product of (A) a polymeric diol having a molecular weight of about 800–5000, (B) an aromatic diisocyanate and an aliphatic diisocyanate, and (C) a chain extender consisting of hydrazine and/or its derivatives, and mainly an organic diamine and a hindered amine compound. Though the composite sheet material is fairly improved, it is still required to suppress its rubber-like elasticity and to improve its abrasion resistance and tailorability in heat setting and ironing.

Accordingly, it is an object of this invention to provide a composite sheet material having a dense and elaborate structure as well as soft and pliable hand characteristics.

It is another object of this invention to provide a composite sheet material whose excellent initial hand and structure changes little after long wear.

A still further object of this invention is to provide a composite sheet material which does not discolor under the influence of ultraviolet irradiation or exposure to exhaust gases of motor vehicles, or nitrogen oxide gas, for example.

It is still another object of this invention to provide a method for preparing a composite sheet material having excellent initial mechanical properties such as tensile strength, tear strength, abrasion resistance and pilling resistance. And further, these excellent initial properties change little, notwithstanding various physical and chemical treatments such as dyeing, etc., as well as after long wear.

It is another object of this invention to provide a dense, elaborate and pliable composite sheet material by impregnating a fabrous sheet with a glycol-extended polyurethane elastomer having a hindered amine compound within the polymeric molecular chain, wherein the rate of thickness before the wet coagulating process relative to the process after wet coagulation is comparatively larger than known examples, and then making the sheet dense and elaborate.

Another object of this invention is to provide a composite material having suppressed repulsive elasticity and good tailorability which is realized by employing a glycol-extended polyurethane elastomer.

The foregoing and other objects of this invention are accomplished by providing a composite sheet material comprising a fibrous sheet which is impregnated and/or is coated with a polyurethane elastomer comprising the reaction products of:

(A) a polymeric diol having a molecular weight of about 800–5000, (B) an organic polyisocyanate, and (C) a chain extender comprising a low molecular weight organic diol, and optionally (D) a chain terminator having one active hydrogen atom;

wherein more than 2 mol % of (C) and/or (D) comprise a hindered amine compound having the formula (I):

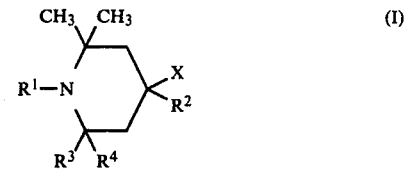

wherein $R^1$ is a substituent selected from the group consisting of hydrogen, oxygen, an alkyl group containing 1–12 carbon atoms, an alkenyl group containing 2-12 carbon atoms an aralkyl group containing 7-18 carbon atoms, an acyl group containing 1-12 carbon atoms, $-(R^5O)_nH$ and $-(COR^6CO_2R^7O)_m-H$, wherein $R^5$ is alkylene group containing 1-12 carbon atoms, $R^6$ is a residue of an organic dicarboxylic acid containing 2-18 carbon atoms, $R^7$ is a residue of an organic diol containing 2-12 carbon atoms, n is an integer from 1 to 50, and m is an integer from 1 to 15;

$R^2$ is a substituent selected from the group consisting of hydrogen, an alkyl group containing 1-12 carbon atoms, an aryl group containing 6-18 carbon atoms, and a cyano group;

X is a substituent selected from the group consisting of a hydroxyl group, an amino group and a monoalkylamino group containing 1-12 carbon atoms, and said substituents whose parts or all of hydrogen bonded to oxygen and/or nitrogen may be substituted by $-(R^5O)_n-H$ and/or $-(COR^6CO_2R^7O)_m-H$, and $R^3$ and $R^4$ are the same or different alkyl groups containing 1-12 carbon atoms or $R^3$ and $R^4$ are bonded to form a 5-12-membered alicyclic ring.

Composite sheet materials comprising a fibrous sheet impregnated and/or coated with a polyurethane elastomer comprising the reaction product of a polymeric diol, an organic diisocyanate and a glycol chain extender have already been known. Although said composite sheet material containing a glycol-extended polyurethane elastomer has a dense structure, it has unfavorably hard hand characteristics and is poor in flexibility. On the other hand, a composite sheet material containing a diamine-extended polyurethane elastomer has, on the whole, too much repulsive elasticity to give a soft hand and is poor in pliability and elaborateness.

We have surprisingly found that a composite sheet material comprising a fibrous sheet and a glycol-extended polyurethane elastomer having a specific hindered amine compound within a molecular chain has a dense and elaborate structure, excellent pliability, a soft and supple touch, a graceful surface appearance and surface smoothness, and good mechanical properties. Furthermore, those excellent initial properties change little after subjecting the product to various physical and chemical treatments such as dyeing, laundering, wet- and dry-cleaning, ironing and pressing as well as actual wearing for a long time.

The polymeric diol of this invention, which is a component of the polyurethane elastomer, is hydroxy-terminated at both ends of the molecule and has a molecular weight of at least about 800-5000, preferably about 1000-4000; it preferably has a melting point below about 70° C., and is selected from the group consisting of polyester glycol, polyether glycol, polyester ether glycol, polyacetal glycol, polybutadiene glycol, etc. Representative polymeric diols may include polyethylene adipate glycol, polypropylene adipate glycol, polytetramethylene adipate glycol, polyhexamethylene adipate glycol, polycaprolactone glycol, polyethylene oxide glycol, polypropylene oxide glycol, polytetramethylene oxide glycol and mixtures thereof. A polymeric diol prepared by co-polymerization may also be employed in this invention.

The organic polyisocyanate of this invention may be selected from phenylene diisocyanate, toluylene diisocyanate, diphenylmethane-4,4'-diisocyanate, diphenyldimethylmethane-4,4'-diisocyanate, naphthylene diisocyanate, diphenyl diisocyanate, ethylene diisocyanate, tetramethylene diisocyanate, hexamethylene diisocyanate, lysine diisocyanate, isophorone diisocyanate, dicyclohexylmethane-4,4'-diisocyanate, dicyclohexyldimethylmethane-4,4'-diisocyanate, xylylene diisocyanate, and so on, and mixtures thereof. A polyisocyanate obtained by the reaction of said organic diisocyanate and polyhydroxyl compound, and a polyisocyanate obtained by trimerization of said organic diisocyanate may also be employed in this invention. The organic diisocyanate is preferred. An aromatic diisocyanate and an alicyclic diisocyanate are more preferred. Toluylene diisocyanate, diphenylmethane-4,4'-diisocyanate, diphenyldimethylmethane-4,4'-diisocyanate, naphthylene diisocyanate, dicyclohexylmethane-4,4'-diisocyanate, dicyclohexyldimethylmethane-4,4'-diisocyanate, isophorone diisocyanate and mixtures thereof are more preferred. 1.7-6 mol equivalents, preferably 1.8-5 mol equivalents to the polymeric diol of an organic diisocyanate may be employed to obtain a composite sheet material having excellent mechanical properties. And, the molar ratio of active hydrogen atoms of chain extenders and chain terminators to the residual isocyanato group is essentially equivalent, i.e. 0.7-1.5, preferably 0.8-1.4, and more preferably 0.9-1.3. The chain extender of this invention comprises a low molecular weight organic diol having a molecular weight of about 50-500, more preferably 60-300. The chain extender may include ethylene glycol, propylene glycol, butane glycol, pentane glycol, neopentyl glycol, hexane glycol, cyclohexane glycol, 1,4-bis(β-hydroxyethoxy)benzene, N,N-bis(β-hydroxyethyl)aniline, xylylene glycol, diethylene glycol, triethylene glycol, and so on, and mixtures thereof. Ethylene glycol, propylene glycol, butane glycol and 1,4-bis(β-hydroxyethoxy)benzene are more preferred.

The hindered amine compound of this invention is a compound having the formula (I), heretofore set forth in detail. Representative of preferable amine compounds are as follows: $R^1$ is preferably a substituent selected from hydrogen, oxygen, methyl, ethyl, propyl, butyl, octyl, allyl, propenyl, butenyl, isopropenyl, linalyl, geranyl, neryl, benzyl, substituted benzyl, acetyl, β-hydroxyethyl and β-hydroxypropyl groups; $R^2$ is a substituent selected from hydrogen, methyl, ethyl, phenyl, benzyl and cyano groups; $R^3$ and $R^4$ are the same or different alkyl groups selected from methyl, ethyl, propyl and butyl groups, or $R^3$ and $R^4$ are bonded to form a cyclopentane, cyclohexane, or cyclododecane ring; X is a substituent selected from the hydroxyl, amino, methylamino, ethylamino, propylamino, butylamino, phenylamino and benzylamino groups. 2,2,6,6-Tetramethyl-4-hydroxypiperidine, 2,2,6,6-tetramethyl-4-methylaminopiperidine, 2,2,6,6-tetramethyl-4-ethylaminopiperidine, 2,2,6,6-tetramethyl-4-propylaminopiperidine, 2,2,6,6-tetramethyl-4-aminopiperidine, 2,2,6-trimethyl-6-ethyl-4-hydroxypiperidine, 2,2,6-trimethyl-6-ethyl-4-aminopiperidine, 2,2-dimethyl-6,6-diethyl-4-hydroxypiperidine, 2,2-dimethyl-6,6-diethyl-4-aminopiperidine, 2,2-dimethyl-4-hydroxy-1-azaspiro[5,5]undecane, and 2,2-dimethyl-4-amino-1-azaspiro[5,5]undecane and the mixtures thereof are preferred. 1,2,2,6,6-pentamethyl-4-hydroxypiperidine, 1,2,2,6,6-pentamethyl-4-aminopiperidine, 1,2,2,6,6-pentamethyl-4-methylaminopiperidine, 1,2,2,6,6-pentamethyl-4-ethylaminopiperidine, 1,2,2,6,6-pentamethyl-4-propylaminopiperidine, 1,2,2,6-tetramethyl-6-ethyl-4-hydroxypiperidine, 1,2,2,6-tetramethyl-6-ethyl-4-aminopiperidine, 1,2,2-trimethyl- 6,6-diethyl-4-hydroxypiperidine, 1,2,2-trimethyl-6,6-diethyl-4-aminopiperidine, 1,2,2-trimethyl-4-hydroxy-1-azaspiro[5,5]undecane, 1,2,2-trimethyl-4-amino-1-azaspiro [5,5]undecane, 1-ethyl-2,2,6,6-tetramethyl-4-hydroxypiperidine, 1-ethyl-2,2,6,6-tetramethyl-4-aminopiperidine, 1-ethyl-2,2,6,6-tetramethyl-4-methylaminopiperidine, 1-ethyl-2,2,6,6-tetramethyl-4-ethylaminopiperidine, 1-ethyl-2,2,6,6-tetramethyl-4-propylaminopiperidine, 1,2-diethyl-2,6,6-trimethyl-4-hydroxypiperidine, 1,2-diethyl-2,6,6-trimethyl-4-aminopiperidine, 1,2,2-triethyl-6,6-dimethyl-4-hydroxypiperidine, 1,2,2-triethyl-6,6-dimethyl-4-aminopiperidine, 1-ethyl-2,2-dimethyl-4-hydroxy-1-azaspiro[5,5]undecane, 1-ethyl-2,2-dimethyl-4-amino-1-azaspiro[5,5]undecane, 1-allyl-2,2,6,6-tetramethyl-4-hydroxypiperidine, 1-allyl-2,2,6,6-tetramethyl-4-aminopiperidine, 1-allyl-2-ethyl-2,6,6-trimethyl-4-hydroxypiperidine, 1-allyl-2-ethyl-2,6,6-trimethyl-4-aminopiperidine, 1-allyl-2,2-diethyl-6,6-dimethyl-4-hydroxypiperidine, 1-allyl-2,2-diethyl-6,6-dimethyl-4-aminopiperidine, 1-allyl-2,2-dimethyl-4-hydroxy-1-azaspiro[5,5]undecane, 1-allyl-2,2-dimethyl-4-amino-1-azaspiro[5,5]undecane, 1-isoprenyl-2,2,6,6-tetramethyl-4-hydroxypiperidine, 1-isoprenyl-2,2,6,6-tetramethyl-4-aminopiperidine, 1-isoprenyl-2-ethyl-2,6,6-trimethyl-4-hydroxypiperidine, 1-isoprenyl-2-ethyl-2,6,6-trimethyl-4-aminopiperidine, 1-isoprenyl-2,2-diethyl-6,6-dimethyl-4-hydroxypiperidine, 1-isoprenyl-2,2-diethyl-6,6-dimethyl-4-aminopiperidine, 1-isoprenyl-2,2-dimethyl-4-hydroxy-1-azaspiro[5,5]undecane, 1-isoprenyl-2,2-dimethyl-4-amino-1-azaspiro[5,5]undecane, 1-benzyl-2,2,,6,6-tetramethyl-4-hydroxypiperidine, 1-benzyl-2,2,6,6-tetramethyl-4-aminopiperidine, 1-benzyl-2,2,6,6-tetramethyl-4-methylaminopiperidine, 1-benzyl-2,2,6,6-tetramethyl-4-ethylaminopiperidine, 1-benzyl-2,2,6,6-tetramethyl-4-propylaminopiperidine, 1-benzyl-2-ethyl-2, 6,6-trimethyl-4-hydroxypiperidine, 1-benzyl-2-ethyl-2,6,6-trimethyl-4-aminopiperidine, 1-benzyl-2,2-diethyl-6,6-dimethyl-4-hydroxypiperidine, 1-benzyl-2,2-diethyl-6,6-dimethyl-4-aminopiperidine, 1-benzyl-2, 2-dimethyl-4-hydroxy-1-azaspiro[5,5]undecane, 1-benzyl-2,2-dimethyl-4-amino-1-azaspiro[5,5]undecane, and mixtures thereof are also preferred. 2,2,6,6-Tetramethyl-4-hydroxypiperidine, 2,2,6,6-tetramethyl-4-aminopiperidine and mixtures thereof are more preferred. 1,2,2,6,6-pentamethyl-4-hydroxypiperidine, 1,2,2,6,6-pentamethyl-4-aminopiperidine, 1-allyl-2,2,6,6-tetramethyl-4-hydroxypiperidine, 1-allyl-2,2,6,6-tetramethyl-4-aminopiperidine, 1-isoprenyl-2,2,6,6-tetramethyl-4-hydroxypiperidine, 1-isoprenyl-2,2,6,6-tetramethyl-4-aminopiperidine, 1-benzyl-2,2,6,6-tetramethyl-4-hydroxypiperidine, 1-benzyl-2,2,6,6-tetramethyl-4-aminopiperidine, and mixtures thereof are also more preferred.

In addition to the hindered amine compounds described above, this invention includes derivatives of them which are formed by substituting at least one hydrogen atom bonded to an oxygen atom and/or a nitrogen atom of the substituent denoted by $R^1$ and/or X of the formula (I) with $-(R^5O)_n-H$ and/or $-(COR^6CO_2R^7O)_m-H$. The former derivatives are obtained, for example, by reacting said hindered amine compound and an alkylene oxide ($R^5O$). The alkylene oxide may include ethylene oxide, propylene oxide, butylene oxide, tetrahydrofuran, styrene oxide, epichlorohydrin and mixtures thereof. Ethylene oxide is more preferred. n is an integer from 1 to 50.

In the case of the latter derivatives, $R^6$ is the residue of an organic dicarboxylic acid having 2–18 carbon atoms, $R^7$ is the residue of an organic diol containing 2–12 carbon atoms, and m is an integer from 1 to 15. The organic dicarboxylic acid may include glutaric acid, pimelic acid, suberic acid, adipic acid, methyladipic acid, succinic acid, azelaic acid, sebacic acid, oxalic acid, phthalic acid, maleic acid, fumaric acid, cyclohexane dicarboxylic acid and mixtures thereof. The organic diol may include ethylene glycol, propylene glycol, butanediol, pentanediol, hexanediol, octanediol, diethylene glycol, triethylene glycol and mixtures thereof.

The hindered amine compounds may be prepared according to the method described in U.S. Pat. No. 4,102,870 and the references cited therein.

Where the hindered amine compound is monofunctional, the amount of usage is restricted to obtain a polyurethane elastomer having a desirable molecular weight because it plays the role of a chain terminator. 2–20 mol %, preferably 2–15 mol %, more preferably 2–12 mol % of the chain extender and chain terminator may be employed in the practice of this invention. Other monoamines or monoalcohols may also be employed as chain terminators.

Where the hindered amine compound is difunctional, its amount is not specifically restricted, but favorably 2–30 mol %, more favorably 2–20 mol %, most favorably 2–12 mol % of chain extenders may be employed in this invention.

Where the hindered amine compound is trifunctional, excessive use brings about increased viscosity or sometimes gelation. Accordingly, it is used in an amount of 2–12 mol %, based upon the mols of chain extenders.

It is, of course, possible to use various types of hindered amine compounds at the same time.

The solvent for the polyurethane elastomer of this invention is not restricted in nature, so long as it is capable of dissolving the polyurethane elastomer. Suitable solvents include dimethylformamide, dimethylacetamide, hexamethylphosphoramide, N-methyl-2-pyrolidone, dimethylsulfoxide, diethylformamide, dioxane, tetrahydrofuran, o-chlorophenol and mixtures thereof. Among these, dimethylformamide, dimethylacetamide and dimethylsulfoxide are preferred.

The polyurethane elastomer of this invention may be prepared, for example, by a single-step process, namely the polymeric diol, the organic polyisocyanate and the chain extenders, and if necessary, the chain terminator may be reacted at the same time. It is also possible to employ the so-called "prepolymer method", wherein a prepolymer obtained by the reaction of a polymeric diol and an organic polyisocyanate is chain extended by adding a chain extender. The hindered amine compound having the formula (I) may be added at any reaction stage. In order effectively to incorporate the hindered amine compound within the molecular chain, it is preferable to add the hindered amine compound at an early reaction stage.

It is, of course, possible to add certain catalysts such as tertiary amines (for example, triethylene diamine) and organometallic compounds such as dibutyltin dilaurate, as described in the publication of S. L. Reegen and K. C. Frisch, "Advances in Urethane Science and Technology", 1 (1971) Technomic. Pub. Inc., during the preparation of the polyurethane elastomer of this invention.

The fibrous sheet material which may be employed in accordance with this invention may be a woven fabric, a knitted fabric or a non-woven fabric, and preferably may be formed of bundles of superfine filaments or fibers. The expression "superfine" as used herein means below about 1.5 denier, preferably below 0.8 denier, and preferably bundles of at least 5 superfine filaments or fibers, more preferably bundles of at least 16 superfine filaments or fibers. A polyester or polyamide fiber, preferably a polyethyleneterephthalate fiber may be employed in the practice of this invention.

A multicomponent fiber that forms a bundle of superfine denier fibers by elimination of at least one component may preferably be used in the practice of this invention. Bundles of superfine filaments or fibers which result from processing special islands-in-a-sea type multicomponent filaments or fibers by eliminating the sea component, as described in U.S. Pat. No. 3,531,368 and U.S. Pat. No. 4,008,344, are especially suitable. Other types of multicomponent filaments or fibers, such as polymer blend-type filaments or fibers, or partition-type filaments or fibers, disclosed for example in B.P. No. 1,393,351 and U.S. Pat. No. 4,051,287 may also be used.

The fibrous sheet material used in the practice of this invention may be obtained by forming a sheet, such as by needle punching, weaving or knitting the above-described multicomponent filaments or fibers, and by eliminating one of the component polymers by use of a solvent, or peeling apart the components mechanically, to form bundles of superfine filaments or fibers in the sheet.

Various methods exist for manufacturing a composite sheet material prepared by impregnating and/or coating a fibrous sheet with the polyurethane elastomer. One representative method is described as follows. A non-woven web formed from the above-mentioned multicomponent filaments or fibers, such as islands-in-a-sea type filaments or fibers, is intertwined by needle punching or other methods and subsequently the soluble component of the filament or fiber is extracted by use of a solvent to yield a non-woven fabric composed of superfine filaments or fibers of polyethylene terephthalate. Such non-woven fabric is impregnated with a solution of the polyurethane elastomer of this invention, is wet-coagulated with water which extracts the solvent, and is dried and buffed on its surace to yield a sheet having graceful naps of filaments or fibers. The napped sheet is preferably dyed by passing it through a venturi nozzle repeatedly with exposure to a dyeing fluid to give the sheet a crumpled effect. Another preferred method comprises dissolving the soluble component of the islands-in-a-sea type filament or fiber subsequent to the process of polyurethane elastomer impregnation. This is followed by extraction of solvent, and then by buffing and dyeing as described. A more preferred method comprises applying an aqueous solution of water-soluble polymer, such as polyvinylalcohol, starch or carboxymethyl cellulose, to the non-woven fabric sheet of the islands-in-a-sea fibers, then dissolving the soluble component of said fibers, impregnating said fibrous sheet with the solution of polyurethane elastomer of this invention, wet-coagulating with water, extracting the solvent and the water-soluble polymer with hot water, buffing and dyeing. Slicing and pressing steps may be applied to adjust the thickness of the sheet at any suitable stage. Before performing the buffing step, a specific silicone polymer may be applied to the sheet to obtain naps of suitable length and appearance.

The amount of polyurethane elastomer may be determined according to the quality or use of the composite sheet and is generally about 2-200%, more preferably 2-20% (in the case of the knitted or woven base sheet) and 10-100% (in the case of the non-woven base sheet) by weight of the fibrous sheet.

It is possible to add a stabilizer, such as an antioxidant and/or an ultraviolet absorbing reagent, an organic and/or inorganic pigment, carbon black, titanium dioxide, an adjusting agent for controlling the porous structure of the polyurethane elastomer, etc., into the solution of said polyurethane elastomer. Various finishing reagents such as a water repellent reagent, a softener, a soil-protecting reagent, and an electrostatic retardant may be applied to the composite sheet material of this invention.

The composite sheet material of this invention, prepared by the method described above, has a dense and elaborate structure, good pliability, a soft and supple touch, a graceful surface appearance and surface smoothness, and excellent mechanical porperties. Furthermore, these excellent initial properties change little after undergoing various physical and chemical treatments, such as dyeing, laundering, wet- and dry-cleaning, ironing and pressing as well as after wearing for a long time.

The provision of synthetic leather with a top-coated layer is also included within the scope of this invention. This is realized by coating a fibrous sheet with a polyurethane elastomer of this invention. Such a top-coated type composite sheet has the excellent properties described above and further has good crack resistance on its coated surface.

This invention is further illustrated by the following Examples in which a composite sheet material impregnated and/or coated with the polyurethane elastomer is evaluated by actual measurements as follows. These Examples are intended to be illustrative but not to limit the scope of the invention, which is defined in the appended claims.

The following test methods and procedures will be referred to in the Examples:

Flexibility is defined as the force in grams which is required to bend, through a deflection of 2 mm, a sample which is 2 cm × 5 cm in size, and which is restrained at spaced points 1 cm apart at a common level. The bending is accomplished by means of a pull rod which contacts the sample midway between the spaced points, and the pull rod is preferably connected to a load cell to measure the required force. A sheet with considerable flexibility has a flexibility value of less than about 100 grams.

Repulsive elasticity is defined herein as an arc length measured after quadruply folding a sample having a size of 2 cm × 10 cm, maintaining the folded sample under a load of 4 kg. for five minutes and forming an arc with a substance which weighs 25 g and which is hung from fulcrums at a distance 50 cm apart, the arc being provided by the recovery force of the folded sample. For comparison purposes, a typical natural suede leather has an arc (a repulsive elasticity value) of 0.5-1.0 cm.

Smoothness and surface appearance: smoothness on the surface and excellence of surface appearance are judged, each in 5 degrees. A high number shows good quality.

Weathering deterioration test: a sample is irradiated by use of a Sunshine Weather Meter manufactured by Suga Testing Machine Co. Inc., for 100 hrs. at 60°–70° C. and exposed to air containing 70% moisture.

Tensile Strength: a sample (20×100 mm) is measured by use of a Tensilon UTM-III-100 tester, manufactured by Toyo Baldwin Co. Inc.

Abrasion by Shiefer Abrasion Testing Machine: The surface of the napped sheet is abraded by use of a Shiefer abrasion tester manufactured by San-ei Sokki Co. Inc., using a nylon brush abradant. The angular velocity of the abradant is 59.5 rpm, the angular velocity of the specimen is 61.5 rpm, and the vertical pressure is 8 lbs.

After 60 cycles of abrasion of the specimen, weight loss is measured. It is expressed as relative increase of weight loss in percentage by the Weather-O-Meter deterioration. A high number shows considerable deterioration of the polyurethane elastomer.

Surface Appearance after 2 months' Wear: jumpers of each specimen were sewn and worn for 3 months. Wearability was judged by surface appearance as well as by shape retention at seams, collars, cuffs, and hemlines—in five degrees. A high number indicates good wearability.

Further, in the Examples, abbreviations will be used in the interest of brevity. The abbreviations and their meanings are listed hereinafter.

PTHF—polytetramethylene oxide glycol
PCL—polycaprolactone glycol
PEA—polyethylene adipate glycol
PBA—polybutylene adipate glycol
MDI—diphenylmethane-4,4'-diisocyanate
MBA—4,4'-diaminodiphenylmethane
EG—ethylene glycol
BG—butylene glycol
BHEB—1,4-bis(β-hydroxyethoxy)benzene
IPA—isopropyl alcohol
DBA—dibutylamine
THP—2,2,6,6-tetramethyl-4-hydroxypiperizine
BTHP—1-benzyl-2,2,6,6-tetramethyl-4-hydroxypiperizine
BTAP—1-benzyl-2,2,6,6-tetramethyl-4-aminopiperizine
PHP—1,2,2,6,6-pentamethyl-4-hydroxypiperizine
PAP—1,2,2,6,6-pentamethyl-4-aminopiperizine
ATHP—1-allyl-2,2,6,6-tetramethyl-4-hydroxypiperizine
ATAP—1-allyl-2,2,6,6-tetramethyl-4-aminopiperizine
PA—piperidine

EXAMPLES 1-7

A non-woven polyethylene terephthalate web was made from islands-in-a-sea type stable fibers of 3.4 denier, 51 mm in length, 5 crimps/in., drawn at a ratio of 2.3, which comprised 50 parts of islands component of said polyethylene terephthalate and 50 parts of sea component of polystyrene, said islands component being distributed as 16 islands-in-a-sea components when viewed as a cross section of the fiber. A process of carding and crosslapping was used in making the web. Subsequent needle punching produced a non-woven fabric. The non-woven fabric was immersed in a 20% aqueous solution by weight of polyvinylalcohol, dried and its sea component (polystyrene) was extracted with perchloroethylene to yield a non-woven fabric comprising superfine denier fibers(0.2 denier).

An isocyanate intermediate called a "prepolymer" was prepared by the reaction of 1 mol of PCL having a molecular weight of 2060 and 3 mols of MDI for an hour at 80° C., and was dissolved in dimethylformamide to yield a solution of 50% by weight. A dimethylformamide solution of EG, BTHP and IPA (molar ratio: 93:6:1) was added to a 50% solution of the "prepolymer", and was reacted for 20 hrs. at 30° C. 0.97 molar equivalent of active hydrogen atom of EG, BTHP and IPA to the isocyanate group of the prepolymer is employed in the above-mentioned claim-extending reaction. After the reaction, the solution was diluted with dimethylformamide to give a 13% dimethylformamide solution of the polyurethane elastomer of this invention.

The non-woven fabric obtained by the method described above was immersed in the polyurethane elastomer solution, squeezed between rollers, coagulated with water for 1 hour, treated with hot water at 80° C. to extract the solvent and polyvinylalcohol, dried, sliced to a thickness of 1.1 mm and buffed to nap the sheet. The napped sheet, which had a thickness of 0.85 mm, was dyed in dyeing equipment referred to as "circular", manufactured by Hisaka Works Co. Ltd., of Japan, said sheet being passed repeatedly through a venturi nozzle for 1 hour at 125° C. together with an aqueous solution containing 2% o.w.f. of a disperse dye. A napped sheet having a density of 0.256 g/cm$^3$ was obtained by finish brushing the dyed sheet.

The napped sheets of Examples 2–7 and Comparisons 1, 2, 4 and 6 were obtained in the same manner as explained above, except for using different polyurethane elastomers whose compositions are shown in Table 1.

For the purpose of further comparison, a napped sheet was obtained in the same manner as explained above except for using diamine-extended polyurethane elastomers whose compositions are shown in Table 1 (Comparisons 3 and 5). As an example, a preparation of diamine-extended polyurethane elastomer of Comparison 3 is described hereinafter.

A prepolymer was prepared by the reaction of 1 mol of PCL having a molecular weight of 2060, 2 mol equivalents of MDI and 0.06 mol equivalents of BTHP for 100 min. at 80° C. under stirring and was dissolved in dimethylformamide to yield a solution of 50% by weight. A dimethylformamide solution of 0.93 mol equivalents of MBA and 0.1 mol equivalents of DBA was added to said 50% solution and reacted for 2 hrs. at 20° C. to give a 25% by weight dimethylformamide solution of a polyurethane elastomer (Comparison 3).

EXAMPLE 8

One mol of polymeric diols consisting of 50% by weight of PTHF having a molecular weight of 2960 and 50% by weight of PCL having a molecular weight of 2910, 5 mols of MDI, 3.8 mols of EG and 0.2 mols of PHP were dissolved in dimetylformamide to give a 50% by weight solution and were reacted for 20 hrs. at 40° C. With rise in viscosity, said solution was diluted with dimethylformamide to give a 30% by weight dimethylformamide solution of a polyurethane elastomer having a viscosity of 810 p. at 20° C.

A napped sheet was obtained in the same manner as explained in Example 1 using said 13% by weight dimethylformamide solution of a polyurethane elastomer.

For the purpose of comparison, a napped sheet was obtained in the same manner as explained above, except for using a polyurethane elastomer whose composition is shown in Table 1 (Comparison 7).

EXAMPLE 9

One mol of polymeric diols consisting of 50% by weight of PTHF having a molecular weight of 1310 and 50% by weight of PCL having a molecular weight of 1250, 2.1 mols of MDI, 1.04 mols of EG and 0.06 mol of BTHP were reacted in the same way as described in Example 8 to give 14% by weight of a polyurethane elastomer and using said polyurethane elastomer a napped sheet was obtained in the same manner as explained in Example 8.

For the purpose of comparison, a napped sheet was obtained in the same manner as explained above except for using a polyurethane elastomer whose composition is shown in Table 1 (Comparison 8).

The properties of the napped sheets of Examples 1 to 9, and the Comparisons 1 to 8, are shown in Table 1.

The results in Table 1 explicitly show that the sheets of this invention, having a polyurethane elastomer with a specific hindered amine within the polymer chains, have a dense and elaborate structure as is shown in a high density, a pertinent pliability as well as a soft and supple touch as are shown in low values both in flexibility and repulsive elasticity, good initial mechanical properties (a tensile strength value is shown in Table 1 as an example), and a good surface smoothness and excellence of naps, compared to a napped sheet having a conventional glycol-extended polyurethane elastomer. Further, said initial superior properties of the sheets of this invention change less after exposure to the Weather-O-Meter and after long, actual wear in the mechanical properties, discoloration and abrasion resistance.

Compared to sheets having a diamine-extended polyurethane elastomer, although by incorporating the hindered amine compound within molecular chain said sheets have fairly good properties, the sheets of this invention are superior in the above-described properties, especially in higher initial mechanial properties, excellent pliability as well as a soft and supple touch, as are shown in lower values in flexibility and repulsive elasticity, and a better abrasion resistance after Weather-O-Meter exposure.

EXAMPLE 10

The unsliced sheet of Example 1 was sliced into 1.5 mm thickness to produce a base sheet material for a coated leather. A coating material obtained by mixing 3% of carbon black into a 25% dimethylformamide solution of the polyurethane elastomer of Example 1 was applied to said base sheet material in a thickness of 0.5 mm, was wet-coagulated with water for 30 min., the solvent was then extracted with hot water for 30 min., and the product was dried for 1 hr. at 100° C. to produce a synthetic leather. For comparison, a synthetic leather was obtained in the same manner as explained above, except using a polyurethane elastomer of Comparison 1 (Comparison 9). The surface smoothness of both the synthetic leathers after extension, which is one of the most important properties in making shoes, was tested in a curved surface smoothness by a dome-plasticity tester manufactured by San-ei Sokki Co. Inc., of Japan. As is shown in Table 2, the sheet of this invention is superior.

Further, both synthetic leathers were exposed to the effects of a Weather-O-Meter for 50 hrs. and evaluations were made of surface crack resistances by measuring the number of strokes required to cause cracks to occur, using a flexometer in accordance with Japanese Industrial Standard (JIS) K-6545. the results are shown in Table 2.

TABLE 1

| | COMPOSITION OF POLYURETHANE ELASTOMER | | | PROPERTIES OF COMPOSITE SHEET MATERIALS | | | | | | | | | | |
|---|---|---|---|---|---|---|---|---|---|---|---|---|---|---|
| | | | | Concentration of Polyurethane (%) | INITIAL PROPERTIES | | | | | PROPERTIES AFTER EXPOSURE TO WEATHER-O-METER | | | | Surface Appearance after 2 months wear (Class) |
| | Polymeric diol molecular weight (Wt. %) | Organic diisocyanate | Chain Extender and Chain Terminator (mol %) | | Apparent Density (g/cm³) | Tensile Strength (kg/cm³) | Flexibility (g) | Repulsive Elasticity (cm) | Smoothness and Surface Appearance (Class) | Flexibility (g) | Repulsive Elasticity (cm) | Smoothness and Surface Appearance (Class) | Retention of Tensile Strength (%) | Relative Increase in Abrasion (%) | Discoloration (Class) | |
| Example 1 | PCL 2060 (100) | MDI | EG (93) BTHP (6) IPA (1) | 13 | 0.256 | 8.7 | 165 | 2.6 | 4 | 165 | 2.6 | 4 | 90 | 140 | 5 | 5 |
| Comparison 1 | PCL 2060 (100) | MDI | EG (96) IPA (4) | 13 | 0.249 | 8.4 | 180 | 3.0 | 5 | 183 | 3.3 | 2 | 85 | 360 | 3 | 3 |
| Comparison 2 | PCL 2060 (100) | MDI | EG (93) PZ (3) IPA (3) | 13 | 0.250 | 8.3 | 178 | 3.0 | 4 | 179 | 3.2 | 1 | 78 | 380 | 3 | 1 |
| Comparison 3 | PCL 2060 (100) | MDI | MBA (93) BTHP (6) DBA (1) | 13 | 0.250 | 7.2 | 250 | 6.6 | 3–4 | 258 | 6.5 | 3 | 90 | 270 | 4 | 4 |
| Example 2 | PEA 2078 (100) | MDI | EG (93) BTAP (6) IPA (1) | 13 | 0.256 | 8.6 | 173 | 3.0 | 5 | 173 | 3.0 | 4 | 95 | 148 | 5 | 5 |
| Example 3 | PBA 2036 (100) | MDI | EG (93) PHP (6) IPA (1) | 13 | 0.263 | 8.5 | 175 | 2.9 | 5 | 175 | 2.9 | 5 | 95 | 163 | 5 | 5 |
| Example 4 | PTHF 1998 (50) PCL 2060 (50) | MDI | BHEB (94) THP (5) IPA (1) | 13 | 0.250 | 8.5 | 182 | 4.1 | 5 | 183 | 4.3 | 4 | 93 | 170 | 4 | 5 |
| Comparison 4 | PTHF 2040 (50) PCL 2060 (50) | MDI | BHEB (96) IPA (4) | 13 | 0.244 | 8.3 | 215 | 5.2 | 4 | 230 | 5.8 | 2 | 87 | 400 | 2 | 3 |
| Example 5 | PCL 2060 (100) | MDI | EG (93) PAP (6) IPA (1) | 13 | 0.256 | 8.7 | 165 | 2.7 | 4 | 167 | 2.8 | 4 | 93 | 138 | 4 | 5 |
| Comparison 5 | PTHF 2004 (50) PEA 2100 (50) | MDI | MBA (85) PAP (10) DBA (5) | 14 | 0.263 | 6.9 | 200 | 5.3 | 5 | 200 | 5.3 | 4 | 90 | 210 | 4 | 4 |
| Example 6 | PCL 2060 (100) | MDI | BG (95) ATAP (4) IPA (1) | 13 | 0.253 | 8.4 | 164 | 2.6 | 4 | 166 | 2.6 | 5 | 92 | 140 | 5 | 4 |
| Example 7 | PTHF 1998 (100) | MDI | EG (95) ATHP (4) IPA (1) | 13 | 0.246 | 7.8 | 210 | 3.9 | 5 | 215 | 3.9 | 3 | 85 | 380 | 4 | 4 |
| Comparison 6 | PTHF 1998 (100) | MDI | EG (96) IPA (4) | 13 | 0.240 | 7.2 | 230 | 4.7 | 3 | 250 | 5.6 | 1 | 53 | 640 | 3 | 1 |
| Example 8 | PTHF 2960 (50) PCL 2910 (50) | MDI | EG (95) PHP (5) | 13 | 0.254 | 8.3 | 210 | 3.9 | 4 | 212 | 3.9 | 4 | 87 | 173 | 4 | 4 |
| Comparison 7 | PTHF 2960 (50) PCL 2910 (50) | MDI | EG (100) | 13 | 0.249 | 7.9 | 226 | 4.5 | 3 | 230 | 4.9 | 3 | 64 | 390 | 3 | 2 |
| Example 9 | PTHF 1310 (50) PCL 1250 (50) | MDI | EG (95) BTHP (5) | 14 | 0.303 | 8.5 | 190 | 3.2 | 5 | 192 | 3.4 | 4 | 88 | 170 | 4 | 5 |
| Comparison 8 | PTHF 1310 (50) PCL 1250 (50) | MDI | EG (100) | 14 | 0.290 | 8.2 | 210 | 4.1 | 3 | 212 | 4.2 | 3 | 65 | 390 | 3 | 3 |

The values in Table 2 explicitly show that surfaces obtained by using polyurethane elastomers of this invention have remarkably improved crack resistance.

TABLE 2

| | Surface Smoothness when being extended | Crack Resistance (No. of strokes of crack occurance) | |
|---|---|---|---|
| | | No Irradiation | Irradiation of Weather-O-Meter |
| Example 10 | Good | $850 \times 10^3$ | $700 \times 10^3$ |
| Comparison 9 | Medium | $600 \times 10^3$ | $30 \times 10^3$ |

We claim:

1. A composite sheet material comprising a fibrous sheet which is impregnated and/or coated with a polyurethane elastomer wherein said polyurethane elastomer comprises the reaction product of
   (A) a polymeric diol having a molecular weight of about 800–5000,
   (B) an organic polyisocyanate, and
   (C) a chain extender comprising a low molecular weight organic diol, more than 2 mol % of which comprises a hindered amine compound of the formula (I)

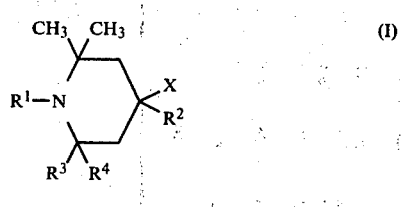

wherein
$R^1$ is a substituent selected from the group consisting of hydrogen, oxygen, an alkyl group containing 1–12 carbon atoms, an alkenyl group containing 2–12 carbon atoms, an aralkyl group containing 7–18 carbon atoms, an acyl group containing 1–12 carbon atoms, $-(R^5O)_nH$ and $-(COR^6CO_2R^7O)_m-H$, wherein $R^5$ is an alkylene group containing 1–12 carbon atoms, $R^6$ is a residue of an organic dicarboxylic acid containing 2–18 carbon atoms, $R^7$ is a residue of an organic diol containing 2–12 carbon atoms, n is an integer from 1 to 50 and m is an integer from 1 to 15;

$R^2$ is a substituent selected from the group consisting of hydrogen, an alkyl group containing 1–12 carbon atoms, an aryl group containing 6–18 carbon atoms, and a cyano group; X is a substituent selected from the group consisting of a hydroxyl group, an amino group and a monoalkylamino group containing 1–12 carbon atoms, and said substituents whose part of or all of hydrogen bonded to oxygen and/or nitrogen may be substituted by $-(R^5O)_n-H$ and/or $-(COR^6CO_2R^7O)_m-H$, and wherein $R^3$ and $R^4$ are the same or different alkyl groups containing 1–12 carbon atoms, $R^3$ and $R^4$ being independent or bonded to form a 5–12 member alicyclic ring.

2. The sheet material defined in claim 1, which is also the reaction product of
   (D) a chain terminator having one active hydrogen atom, wherein more than 2 mol % of (C) and/or (D) comprise a hindered amine compound having the formula (I).

3. The composite sheet material of claim 1, wherein said fibrous sheet is composed mainly of fiber bundles of superfine denier filaments or fibers having deniers of less than about 1.5.

4. The composite sheet material of claim 1, wherein said fibrous sheet is composed mainly of fiber bundles of superfine denier filaments or fibers having deniers of less than about 0.8.

5. The composite sheet material of claim 3, wherein said fiber bundles comprises at least about 5 of said superfine denier filaments or fibers per bundle.

6. The composite sheet material of claim 1, wherein said fibrous sheet comprises a non-woven fabric.

7. The composite sheet material of claim 1, wherein said fibrous sheet comprises a woven fabric.

8. The composite sheet material of claim 1, wherein said fibrous sheet comprises a knitted fabric.

9. The composite sheet material of claim 1, wherein said composite sheet material has naps consisting of superfine denier filaments or fibers on at least one surface.

10. The composite sheet material of claim 3, wherein said filaments or fibers constituting the fibrous sheet material consist essentially of a polymer selected from the group consisting of polyester and polyamide.

11. The composite sheet material of claim 1, wherein said polymeric diol is selected from the group consisting of polyester glycol, polyether glycol, polyetherester glycol, polyacetal glycol, polycarbonate glycol, polybutadiene glycol and mixtures thereof.

12. The composite sheet material of claim 1, wherein said polymeric diol has a molecular weight of about 1000–4000, and has a melting point below 70° C.

13. The composite sheet material of claim 1, wherein said polymeric diol is selected from the group consisting of polyester glycol and polyether glycol.

14. The composite sheet material of claim 1, wherein said polymeric diol is selected from the group consisting of polyethylene adipate glycol, polypropylene adipate glycol, polytetramethylene adipate glycol, polyhexamethylene adipate glycol, polycaprolactone glycol, polyethylene oxide glycol, polypropylene oxide glycol, polytetramethylene oxide glycol and mixtures thereof.

15. The composite sheet material of claim 1, wherein said organic polyisocyanate is selected from the group consisting of the aromatic diisocyanate and the alicyclic diisocyanates.

16. The composite sheet material of claim 15, wherein said organic polyisocyante is selected from the group consisting of toluylene diisocyanate, diphenylmethane-4,4'-diisocyanate, diphenyldimethylmethane-4,4'-diisocyanate, naphthylenediisocyanate, dicyclohexylmethane-4,4'-diisocyanate, dicyclohexyldimethylmethane-4,4'-diisocyanate, isophoronediisocyanate, and mixtures thereof.

17. The composite sheet material of claim 1, wherein said low molecular weight organic diol has a molecular weight from 50 to 500.

18. The composite sheet material of claim 1, wherein said low molecular organic diol has a moleculr weight from 60 to 300.

19. The composite sheet material of claim 1, wherein said low molecular weight organic diol is selected from the group consisting of ethylene glycol, propylene glycol, 1,4-butane glycol, 1,4-bis($\beta$-hydroxyethoxy)benzene, and mixtures thereof.

20. The composite sheet material of claim 1, wherein said hindered amine compound is selected from the group consisting of compounds having the formula (I), wherein $R^1$ is a hydrogen, methyl, ethyl, allyl, butenyl, neryl, geranyl, benzyl, acetyl, β-hydroxyethyl, or β-hydroxypropyl group, and $R^2$ is a hydrogen, methyl, ethyl, benzyl, phenyl or cyano group, X is hydroxy, amino, methylamino, ethylamino or phenylamino group, and $R^3$ and $R^4$ are the same or different alkyl groups selected from methyl, ethyl and propyl groups, or $R^3$ and $R^4$ are bonded to form a 5-, 6-, or 12-membered alicyclic ring.

21. The composite sheet material of claim 1, wherein said hindered amine compound is selected from the group consisting of 2,2,6,6-tetramethyl-4-hydroxypiperidine, 2,2,6,6-tetramethyl-4-aminopiperidine, 1,2,2,6,6-pentamethyl-4-hydroxypiperidine, 1,2,2,6,6-pentamethyl-4-aminopiperidine, 1-allyl-2,2,6,6-tetramethyl-4-hydroxypiperidine, 1-allyl-2,2,6,6-tetramethyl-4-aminopiperidine, 1-benzyl-2,2,6,6-tetramethyl-4-hydroxypiperidine, 1-benzyl-2,2,6,6-tetramethyl-4-aminopiperidine and mixtures thereof.

22. The composite sheet material of claim 20, wherein said hindered amine compound is selected from the group consisting of 1,2,2,6,6-pentamethyl-4-hydroxypiperidine, 1,2,2,6,6-pentamethyl-4-aminopiperidine, 1-allyl-2,2,6,6-tetramethyl-4-hydroxypiperidine, 1-allyl-2,2,6,6-tetramethyl-4-aminopiperidine, 1-benzyl-2,2,6,6-tetramethyl-4-hydroxypiperidine, 1-benzyl-2,2,6,6-tetramethyl-4-aminopiperidine, and mixtures thereof.

23. The composites sheet material of claim 20, wherein part of or all of the hydrogen atoms bonded to an oxygen and/or a nitrogen atom of said hindered amine compound is substituted by $-(R^5O)_nH$ wherein $R^5O$ originates from ethylene oxide, propylene oxide, tetrahydrofuran or mixtures thereof, and n is an integer from 1 to 50.

24. The composite sheet material of claim 23, wherein said $R^5O$ originates from ethylene oxide.

25. The composite sheet material of claim 20, wherein part or all of hydrogen atoms bonded to an oxygen and/or a nitrogen atom of said hindered amine compound is substituted by $-(COR^6CO_2R^7O)_n-H$, wherein $R^6$ is a residue of an organic dicarboxylic acid selected from the group consisting of succinic acid, adipic acid, azelaic acid, sebacic acid, phthalic acid, glutaric acid, maleic acid, fumaric acid and mixtures thereof, and $R^7$ is a residue of a glycol selected from the group consisting of ethylene glycol, propylene glycol, butanediol, pentanediol, hexanediol and mixtures thereof.

26. The composite sheet material of claim 1, wherein the ratio of said polyurethane elastomer to said fibrous sheet is about 2:100 to 200:100 by weight.

* * * * *

UNITED STATES PATENT AND TRADEMARK OFFICE
CERTIFICATE OF CORRECTION

PATENT NO. : 4,302,493
DATED : November 24, 1981
INVENTOR(S) : Minoru Tanaka et al It is certified that error appears in the above-identified patent and that said Letters Patent are hereby corrected as shown below:

Column 2, line 4, before "an" insert --an alkenyl group
    containing 2 - 12 carbon atoms, --
Column 2, line 9, after "of" delete "an alkenyl group
    containing 2 - 12 carbon atoms"

Signed and Sealed this

Sixteenth Day of November 1982

[SEAL]

Attest:

Attesting Officer

GERALD J. MOSSINGHOFF
Commissioner of Patents and Trademarks